United States Patent [19]

Kasday

[11] 4,430,726

[45] Feb. 7, 1984

[54] DICTATION/TRANSCRIPTION METHOD AND ARRANGEMENT

[75] Inventor: Leonard R. Kasday, Plainsboro, N.J.

[73] Assignee: Bell Telephone Laboratories, Incorporated, Murray Hill, N.J.

[21] Appl. No.: 274,771

[22] Filed: Jun. 18, 1981

[51] Int. Cl.$^3$ ............................................. G06F 3/153
[52] U.S. Cl. .................................................. 364/900
[58] Field of Search ..................... 179/6.01, 6.04, 6.09; 364/900 MS File; 369/24, 25, 29

[56] References Cited

U.S. PATENT DOCUMENTS

| | | | |
|---|---|---|---|
| 3,648,249 | 3/1972 | Goldsberry | 364/900 |
| 3,817,436 | 6/1974 | Matz et al. | |
| 3,904,836 | 9/1975 | Mohammadioun | 369/29 X |
| 3,984,644 | 10/1976 | Matz | 369/29 |
| 4,150,261 | 4/1979 | Mason | |
| 4,221,938 | 9/1980 | Mohammadioun et al. | |
| 4,303,998 | 12/1981 | Plunkett, Jr. | 179/6.09 X |

OTHER PUBLICATIONS

Walshe, W. A.; "Versatile Dictation Equipment Improves Productivity"; American Bar Asso. Jrnl.; vol. 66; Jan. 1980; pp. 56–62.

Nexus 1000 TM; Lanier Business Product Brochure.
Thought Tank System 193; Dictaphone Grp.

Primary Examiner—Thomas M. Heckler
Attorney, Agent, or Firm—John A. Caccuro

[57] ABSTRACT

The disclosed real time dictation arrangement time-shares several transcribers among various users requiring dictation service. The dictation from a user is partitioned into time sequential dictation segments. A controller unit distributes the segments of dictation from each of several users to several transcribers. Voice storage is provided so that users do not have to wait to speak and so that transcribers can pause or repeat the speech being worked on. The controller unit collects the transcribed dictation from the transcribers, and delivers the text to the proper user. A video terminal enables each user to see the transcribed dictation almost as fast as it is spoken, and enables the user to control by means of a cursor where transcribed text is to be inserted.

15 Claims, 13 Drawing Figures

DICTATE CONTROL
MODULE DC I

TRANSCRIBE MODULE
TC1

PROCESS CONTROLLER UNIT

ASSIGNMENT ROUTINE: ASSIGN SEGMENTS FOR DICTATORS WITH ASSIGNED, NON-BUSY TRANSCRIBERS

VOICE PLAYBACK MODULE

DICTATION/TRANSCRIPTION METHOD AND ARRANGEMENT

FIELD OF THE INVENTION

This invention relates to dictation systems and more particularly to a centralized dictation/transcription method and arrangement which shares transcribers among the dictators and which provides a real-time video display of the dictation as it is being transcribed.

BACKGROUND OF THE INVENTION

The generation of a letter, a memorandum, an essay or other documents is a time consuming process. These documents can be composed by writing them, typing them or by dictating them to a machine or another person. It is well known that it is faster to use one's mouth rather than one's hand to compose documents. Studies have also shown that people can dictate faster to a machine than to a secretary. Additionally, studies show that secretaries can transcribe faster and more accurately from a dictation machine than from shorthand notes.

Modern dictation systems have increased the speed of the machine-dictated transcribed document with the result of a cost saving to the users. The characteristics of many of the newer centralized dictation systems is described in an article entitled "Versatile Dictation Equipment Improves Productivity", *American Bar Association Journal*, Vol. 66, January, 1980, at page 56 et seq, by W. A. Walshe. In these centralized dictation systems voice dictation can be transmitted to an idle transcriber or can be stored on a channel of a voice storage media for later transmission in the event all transcribers are busy. These dictation systems also include computer control to keep up-to-the-minute information on the status of each transcriptionist and each dictation job. Reports and summaries of production by author, department, and transcriptionist are also provided. Additionally, the capability exits to connect any transcriptionist to any dictation job on any channel of the voice storage media.

Despite the advancements made in modern centralized dictation systems some people are still reluctant to dictate documents. One problem people have with existing dictation systems is the delay encountered before they receive the transcription of what they have dictated. Additionally, if the dictator makes an error during dictation and prior to transcription audio corrections are difficult to accomplish. Audio corrections utilizing dictation equipment requires mastering the techniques associated with audio playback, audio insertions, audio deletion and audio punctuation. Some audio corrections, like insertions, are not available with existing equipment. Often the dictation results in a typewritten draft which has taken a while to transcribe and which still requires corrections and/or additions to put the document in final form. These corrections and/or additions are usually annotated to the draft copy. Thus, an additional problem with existing dictation systems is the inability to orally annotate or make changes in the draft copy. The transcription delay, audio correction and oral annotation problems of existing dictation systems have not helped to encourage those people who are inherently reluctant to use dictation systems.

SUMMARY OF THE INVENTION

The above described dictation delay problem is substantially eliminated by the disclosed apparatus and method of operating a dictation arrangement which provides enhanced speed by time-sharing transcribers among the dictators. Time sharing is accomplished by receiving a dictator's voice dictation signals, segmenting these signals into sequential segments and assigning each sequential dictation segment to one of a plurality of transcribers. Transcribers are selected according to which one has been idle the longest and/or according to whether that transcriber has previously done transcription work for this particular dictator. As the dictation segments are transcribed the transcription signals from each assigned transcriber are assembled according to the sequential segment assignments and distributed to the originating dictator.

The disclosed dictation transcription arrangement further reduces the above-described dictation delay problem by providing each dictator with a video terminal for providing a real-time video display of the transcribed dictation (text) as it is transcribed. In such an arrangement voice dictation signals from a dictator are sent to an available transcriber. As the voice dictation signals are transcribed they are collected and transmitted to the originating dictator's video terminal for display. Thus, depending on the transcriber's work load the dictator may see the text immediately after the dictation is spoken. In addition, a dictator or user can specify which video display terminal is to receive and display the transcribed dictation. Such an arrangement enables each dictator to dictate a message which, after being transcribed is sent to a specified one or all of the other dictator locations.

Another feature of this dictation arrangement is that the time required to go from the initial dictation to the final document is reduced by using an oral editing and annotation capability. This capability provides the dictator with control for making dictation originated text insertions anywhere in the currently displayed text. In operation the dictator sets a cursor control on the video terminal to the location in the displayed text where an oral annotation is to be made and begins dictation. The arrangement receives a signal from the video terminal indicating the desired insertion location for the oral annotation. The arrangement transmits the dictation to a transcriber. The arrangement collects the resulting transcription signals and transmits the signals for insertion at the cursor location selected by the dictator.

In the method of oral annotation described herein, the system tags the existing cursor position where any of the existing yet-to-be-transcribed dictation is to be displayed while permitting the dictator to move the cursor to the position where the oral annotation is to be made. Thus, the system knows where on the video terminal to display both the existing dictation and the oral annotation.

Deletions, text punctuation and text editing can be handled using key pad controls at the video terminal. Finally, if the arrangement includes a printer, the dictator can request a hard copy of the displayed document once it is in acceptable form. The net result of the above oral annotation capability is a minimization of the time required to make the changes required to convert a draft of a document into the final document.

The disclosed dictation transcription arrangement basically includes dictation terminals, transcriber terminals, voice and text storage, and a main controller unit. In the preferred embodiment each user dictates into a dictation terminal which includes a video display that enables the user to see the transcribed dictation almost as fast as it is spoken. In an alternate embodiment the user can select another video terminal to display the transcribed dictation.

As dictation takes place, the main controller partitions the dictated speech into segments, distributes the segments among available transcribers, and keeps track of where the segments were sent. Voice storage is provided so transcribers can stop, continue, and review their assigned segments, and so user do not have to wait to dictate if all the transcribers are busy. The transcribers have terminals which include means for receiving and means for outputting the voice dictation signals. As the dictation segments are transcribed they are collected in the text storage unit. The collected transcription is then distributed to the originating dictator video terminal or to a video terminal previously selected by the originating dictator. Appropriate control signals cause the segments to be inserted at their proper locations in the video terminal. Therefore, this embodiment includes an oral annotation capability to the displayed text. Additionally, other text additions, modifications or deletions can be made under control of the dictation terminal. Finally, another embodiment enables the generation of a hard copy of the final document.

Thus, the disclosed dictation transcription arrangement enables both fast transcription turn around time and fast dictation to final document capability by time-sharing transcribers among the dictation users, providing real-time video display of the text transcription by providing an oral editing and annotation capability of the existing displayed transcription, and by allowing the user to make deletion and other editing operations directly on the video terminal.

Additionally, the disclosed dictation transcription arrangement enables operation by disabled people. It enables blind typists to be transcribers. Employers are often reluctant to hire blind transcribers because, with most present word processing systems, such individuals can only type first drafts, as they cannot easily find where deletions or insertions are to be made. Since in the disclosed system the dictator would indicate position of insertions with a cursor, the transcriber would no longer need to see the text, so blind transcribers could work as efficiently as sighted ones. Deaf people could use the system to have recorded speech transcribed in an economical manner. People with motion impairments could use the system to dictate since it would only require the ability to speak and operate a simple keypad.

BRIEF DESCRIPTION OF THE DRAWINGS

The principles of the invention will be more fully appreciated from the illustrative embodiment shown in the drawings, in which.

Figure 1:
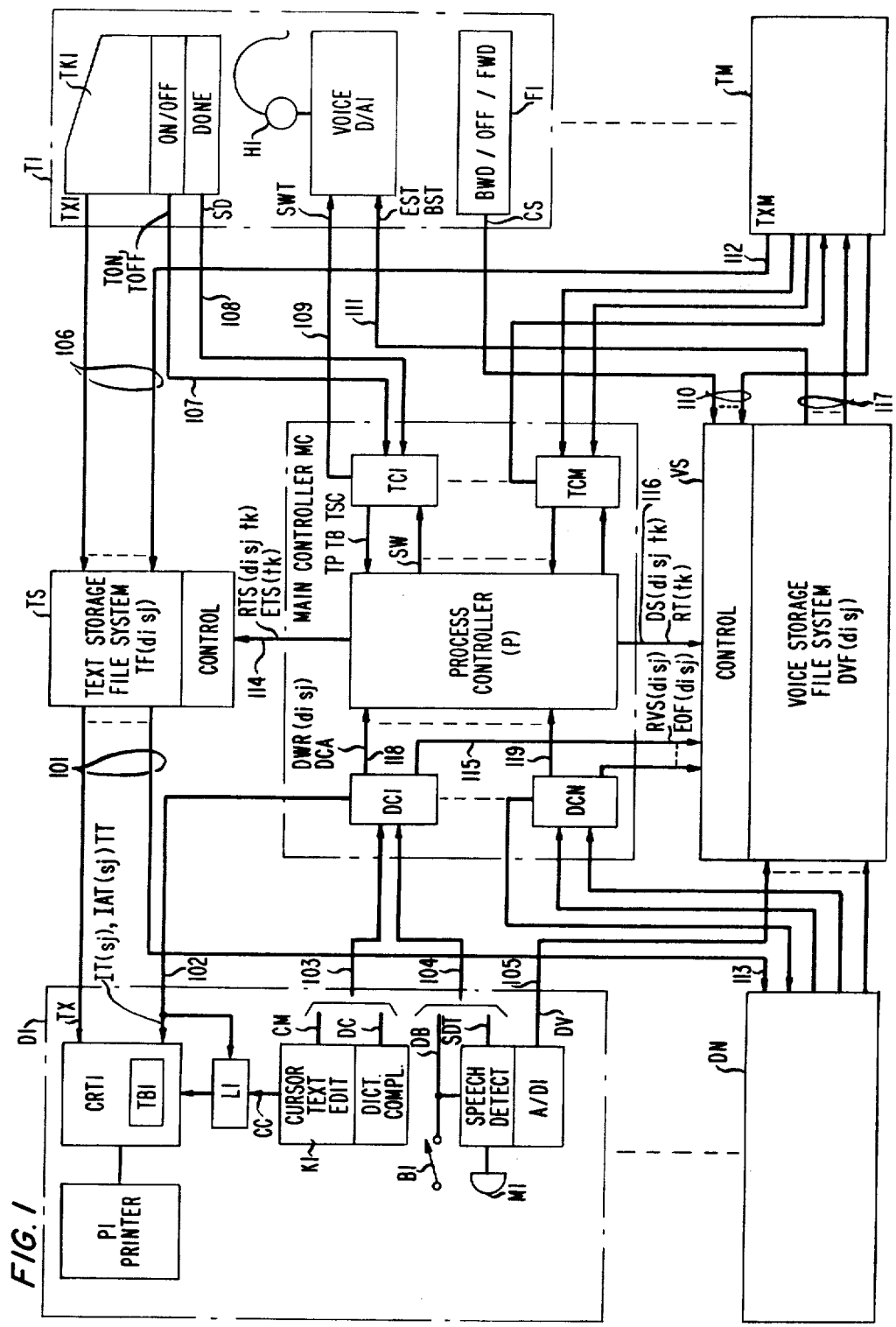
FIG. 1 shows a circuit block diagram of the apparatus of my dictation/transcription arrangement.

Where possible reference numbers in FIGS. 3 through 13 begin with the associated figure number. For example a program step 1201 refers to a part of FIG. 12.

GENERAL DESCRIPTION

While the disclosed equipment, features and operations are implemented as part of a dictation system it will, of course, be obvious to one skilled in the art that the equipment, features and operations described and claimed herein can be used with or combined with other communication systems. However, in such an application the dictation system equipment, features and operations must be blended into the overall structure of the system in which it is used and must be tailored to mesh with all of the other features and operations of such a system. For example, the disclosed dictation system can be incorporated as part of a telephone communication system. In such an application equipment such as the telephone, switching machine and main controller can be shared by both the disclosed dictation system and a telephone communication system. Thus, in order to avoid confusion and in order to allow those skilled in the art to utilize the invention claimed herein, this patent specification will concentrate on providing an understanding of the problems and constraints which were considered in the disclosed dictation/transcription arrangement.

Additionally, in describing the preferred embodiment of the invention illustrated in the drawings, specific terminology will be used for the sake of clarity. However, it is not intended to be limited to the specific terms so selected, and it is to be understood that each specific term includes all technical equivalents which operate in a similar manner to accomplish a similar purpose. For example, the term connection is not necessarily limited to direct connection but also includes connection through other circuit elements of the equivalent of a connection established in a software design.

With reference to FIG. 1, the disclosed dictation/transcription arrangement is shown in circuit block diagram form which includes dictation terminals D1-DN, transcriber terminals T1-TM, main controller MC, voice storage file system VS, and text storage file system TS.

Main controller MC is a program controlled unit which can be any of a number of well known minicomputer microprocessor or microcomputer types (for example one of the Digital Equipment Corporation LSI-11 family). The boxes DC1-DCN, TC1-TCM, and P represent modules of program code in the memory of the main controller MC. The minicomputer implementing MC does one step of code of each module in turn. This is equivalent to having the modules run simultaneously, and is a well known means (time sharing) of doing so. Those skilled in the art will recognize further that the program code in a single dictate or transcriber module can be shared among different dictators and transcribers, respectively. The operation of the individual modules will be described in more detail below.

The voice storage unit holds a set of digitized voice files DVF(di,sj), and the text storage unit holds a corresponding set of digitized text files TF(di,sj). Here DVF(di,sj) is the digitized recording of segment sj from dictator di, and DVF(di,sj) is the transcription of that segment.

Figure 2:
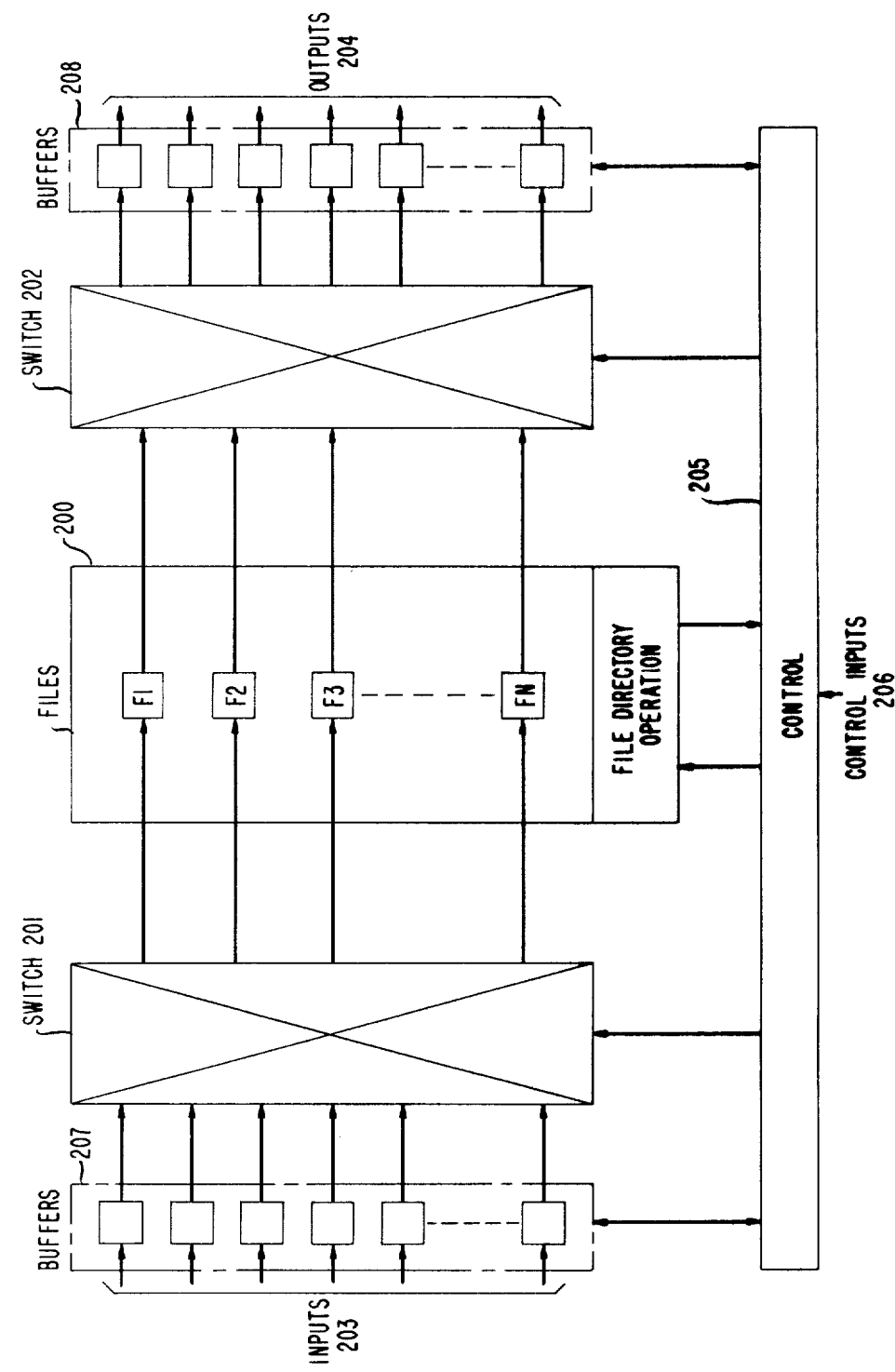
FIG. 2 shows a general block diagram which applies to both the voice storage unit and the text storage unit.

Either voice storage VS or text storage TS can be implemented as shown in the general block diagram of FIG. 2. Each system consists of a variable number of files F1-FN of file 200 and switching provisions 201, 202 for writing into a file from any particular input port 203 and reading a file from any output port 204. Opening and closing of these files as well as the input and output operations are directed by control module 205 in response to control inputs 206. The files F1-FN used for text storage are first in, first out (FIFO) files. The files for voice storage, on the other hand, are read with a pointer which is initially set at the beginning of the file and may be moved forward and backward, thereby reading out the data indicated by the pointer. Software techniques for supporting such file systems are standard and well known. The UNIX [TM] operating system distributed by Western Electric, for example, has these capabilities.

The choice of hardware for the voice storage unit and the text storage unit should take into account the data rates expected in the dictation/transcription arrangement. Text storage requires relatively slow input and output, and can be handled with a separate minicomputer (for control module 205), or can be made to share the minicomputer MC. Alternatively, all the text storage elements shown in FIG. 2 can be contained in a single minicomputer. Text can be initially stored in the minicomputer's core memory, and additional mass storage (e.g., disc) can be added to store text that exceeds core storage, using well known virtual memory techniques. The buffers 207 and 208 can be relatively small, or replaced with simple latches if the minicomputer is fast enough.

Voice storage or memory requires higher data rates, so it should most likely be handled by a separate minicomputer although designs are possible which would share the minicomputer MC. Voice can be stored digitally, e.g. on a Winchester fixed disc. Because of the high data rates, and because effectively simultaneous reading and writing of several files is required, buffering would then be needed at input 203 and output 204. Input buffers 207 may be FIFO, and output buffers 208 may be of the pointer type. The buffers would preferably use hardware rather than minicomputer core to avoid loading the minicomputer. Circuitry from the buffers would inform the minicomputer, with an interrupt signal, when access to or from the disc is required to move data to or from the buffers. In the case of the input buffers, this signal would be delivered when the buffer is nearly full. In the case of the output buffers, this signal would be delivered when the pointer needs to move to data not currently in the buffer. The minicomputer would respond to the interrupt by making the transfer using, preferably, hardware switches (201, 202) connected directly between the buffers and the disc. Interface design to accomplish these functions is straightforward and well known. Alternatively, buffers 207, 208 can be implemented as part of the minicomputer's core memory and transfers made using standard techniques such as direct memory access.

There are, however, two features of voice and text storage VS and TS that although straightforward to implement are not necessarily standard. Voice storage VS contains voice playback modules, FIG. 12, which allow the transcribers to playback speech under control of foot pedals. Distribution of text requires additional capability in the control section of text storage TS that is explained in the discussion accompanying FIG. 13.

Returning to FIG. 1, dictation terminal D1 includes an editing video terminal CRT1 for receiving and displaying transcribed dictation; key pad control K1 for cursor control and for initiating control signals (CC) that alter the displayed transcription, microphone M1 and dictate button B1. CRT1 contains a text buffer TB1 in which text is assembled for display according to signals IT(sj), TT and IAT(sj). An alternative embodiment includes a locking means L1 under control of signals IT(sj), TT and IAT(sj) to prevent alteration of the displayed transcription while dictation signals are being transcribed.

Microphone M1 and button B1 are connected to an analog to digital (A/D) converter A/D1 which digitizes received analog dictation (speech) signals from microphone M1. Converter A/D1 can optionally include well-known speech detection and compression circuits to minimize the necessary bandwidth required to transmit the digital speech. The dictation terminal can be implemented be many well-known units. For example, the terminal can be a model 7300 terminal manufactured by Delta Data Systems, A/D converter can be any codec designed for speech, and the microphone and other miscellaneous elements can be any commonly available units.

Each transcriber terminal T1-TM includes D/A converter D/A1, headphone H1, foot pedal switch F1, and keyboard TK1 with standard typewriter key layout plus ON/OFF and DONE buttons. The transcriber terminal can be implemented by many well known units. For example, terminal T1 can be a ADM3 CRT terminal and keyboard manufactured by Lear-Sieglor together with commonly available switches and other parts.

While the disclosed arrangement utilizes digitize dictation signals an all analog dictation system is obviously realizable. In an analog dictation system each dictator terminal would not need an analog to digital converter such as A/D1. Correspondingly, no digital to analog converter D/A1 would be required in the transcriber terminals. Additionally, voice storage system VS would be an analog storage medium with analog switching capability. Voice would then be stored in analog form using endless loops of tape for each file as in the standard "tank type" dictation units used in existing centralized dictation systems, (e.g. the Nyematic machine manufactured by Lanier Business Products, Inc.).

System Operation

With further reference to FIG. 1, the operation of the system is as follows. A user at terminal D1 signals controller MC by pressing button B1. The resulting signal DB indicates that a dictation process is beginning. This signal is carried between terminal D1 and controller MC by leads 104. Controller MC then signals voice storage VS by signal RVS(di,sj) to open a digitized voice file DVF(di,sj). The user speaks into microphone M1, and the dictation signals are carried via lead 105 and received by a channel of voice storage VS where the speech is stored in a file DVF(di,sj). The dictation is segmented by control signals from the user's button B1 or by controller MC detecting pulses in the dictation by means of the speech detection signal SDT carried over 104, and these segments are stored in corresponding digitized voice files DVF(di,sj) in accordance with further signals RVS(di,sj) from controller MC.

Controller MC then assigns each segment for transcription by an available transcriber. As will be described in a later paragraph controller MC is programmed to attempt to assign successive dictation segments from a given dictator to the same transcriber whenever that transcriber is free, and to serve dictators who have no transcription in progress before those who do. Once a transcriber is selected for the current dictation, segment controller MC signals voice storage VS via lead 116 to switch the segment of voice dictating to the selected transcriber's, terminal via cable 117 under control of the terminal's foot pedal (e.g. F1) over cable 110. The controller MC also transmits a signal RTS(di,sj,tk) to the text storage unit TS over lead 114 to open a text file TF(di,sj) for the transcribed text, and to accept transcription from transcriber tk over one of the leads 106. Finally, controller MC sends signal SWT over e.g. lead 109 to indicate that dictation is waiting.

Note, to reduce the load on controller MC, the actual voice dictation signals are communicated directly between dictation terminals D1-DN and voice storage VS and between voice storage VS and transcriber terminals T1-TM. However, as noted above, the control signals associated with this transfer are initiated by controller MC.

As the dictation is transcribed and collected by text storage TS it is distributed for display on the dictator's video terminal CRT1. A cursor (not shown) on terminal D1 indicates the location at which the transcription is to be displayed. Note, dictator may wish to move the display cursor from a point on the display before the transcription (text) of a previous segment of dictation has been completed, in order to insert, delete, correct or punctuate the existing displayed text. Controller MC allows for this contingency by inserting a tag at the present cursor position on video terminal CRT1 to remember where the transcription of existing dictation is to be displayed. (Another embodiment, not shown, would lock or inhibit the dictator's cursor control until all of that dictator's speech has been transcribed, making any corrections or additions by the dictator wait until the existing dictation is transcribed.)

Additional details of transcription are as follows. A transcriber (e.g. T1) ready to commence work turns ON/OFF switch of terminal T1 to the ON position. The ON/OFF signaling is carried via leads 107 to controller MC. The digital to analog converter D/A1 receives signals from voice storage unit VS via lead 111 under control of foot pedal switch F1, which sends control signals (BW, OFF, FW) to VS via cable 110. The transcriber also hears various tones indicating when dictation work is waiting SWT or when the beginning BST or end of a dictation segment EST has been reached. The transcriber types the dictation or speech on keyboard TK1 and presses the DONE button after completing each dictation segment. The DONE signaling SD is carried via lead 108 to controller MC. The transcriber may then be assigned another segment. When the transcriber wishes to stop work, he or she turns the ON/OFF switch to the OFF position, and completes any present dictation segment which was started. The transcribed dictation TX1 from keyboard TK1 is communicated to text storage TS via one of the leads 106 and is stored in a text file TF(di,sj). The text storage unit TS then distributes the transcribed text to the terminal D1 of the originating dictator D1, along with signal IAT(Si) that cause the text to be inserted at the corresponding tag that was previously inserted in the dictators text buffer, thus causing the text to be assembled in the terminal in the proper order. This process is described more fully below in FIG. 13 and the accompanying discussion.

Note, the previously described equipment utilized to implement the disclosed dictation/transcription arrangement are merely exemplary of an embodiment of the arrangement. Each component or unit can be replaced by other well known equipment types and with appropriate signaling modifications can be made to perform the above described interactions. Also, functionality can be distributed differently among the various units. For example, the text buffer TB1, in which the transcribed text is assembled, could be made a part of text storage TS, in which case CRT1 would only need to hold that part of the text being displayed on the screen. Additionally, a printer P1 is made part of the system of FIG. 1 to provide a hard copy of the text displayed on CRT1.

DETAILED DESCRIPTION

As illustrated in FIG. 1, the firmware or software for the real-time dictation system includes multiple identical dictate control modules DC1-DCN each of which controls the dictation process for an associated dictation terminal D1-DN. Similarly, multiple identical transcriber control modules TC1-TCM handle on a one-to-one basis the transcriber terminals T1-TM. Process controller P communicates with dictate control modules DC1-DCN and transcribe control modules TC1-TCM.

The operation of the disclosed system is most conveniently described by reference to the various flow chart figures and to the buffers and status tables of FIG. 5. The flow diagrams of FIGS. 3, 4 and 6 through 13 disclose in graphical form an exemplary operating sequence of the dictation/transcription system. The flow diagrams consist of a series of geometrical shapes, each of which corresponds to a particular type of operation. Each rectangular block represents the performance of a function which is generally indicated by the notation found within the rectangular block. Each diamond shaped geometrical figure represents a decision making operation where one of two alternatives is determined. Each circular or oval shaped geometrical figure represents an entering (starting) point, exiting (finishing) point or connecting point in the flow diagram. Note, the flow diagrams disclosed here often use a decision stage that waits for an event by cycling in a loop back to its input until the event occurs. Other well known software structures are possible where instead of this continual process, a process is initiated when the event occurs, following a signal within the software program or in response to a hardware interrupt signal.

Dictate Control Module DM1

Basically in operation, dictate modules DC1-DCN send to process controller P requests for segments of dictation to be transcribed. These dictation segments are identified by a label di, sj which respectively identify the dictator number and segment number. Process manager P uses an assignment routine to assign dictation segments to the transcribers. Transcribers are identified by the label tk.

With joint reference to FIG. 1 and FIG. 3, the operating sequence for dictate control module DC1 will be described in the following paragraphs. It is to be noted that all of dictate control modules DC1-DCN operate in the same manner. When the dictate control module is initialized, step 300, voice segment identifier sj is set to 0 (not shown). As shown on FIG. 1 when a dictator presses dictate button B1, signal DB and speech detector signal SDT are generated and sent on lead 104 to controller MC. Dictate module DC1 waits for this signal in 301 of FIG. 3. When the signal arrives, as shown in step 302, segment identifier sj is incremented and a record voice segment signal RVS(di,sj) is sent from dictate control DC1 to the voice storage unit VS. Thus, for dictate control DC1, di=1. Voice storage VS, in turn, opens a digitized voice file DVF(di,sj) in file 200 and using switch 201 causes subsequent voice from dictator di to be appended to that file.

Figure 3:
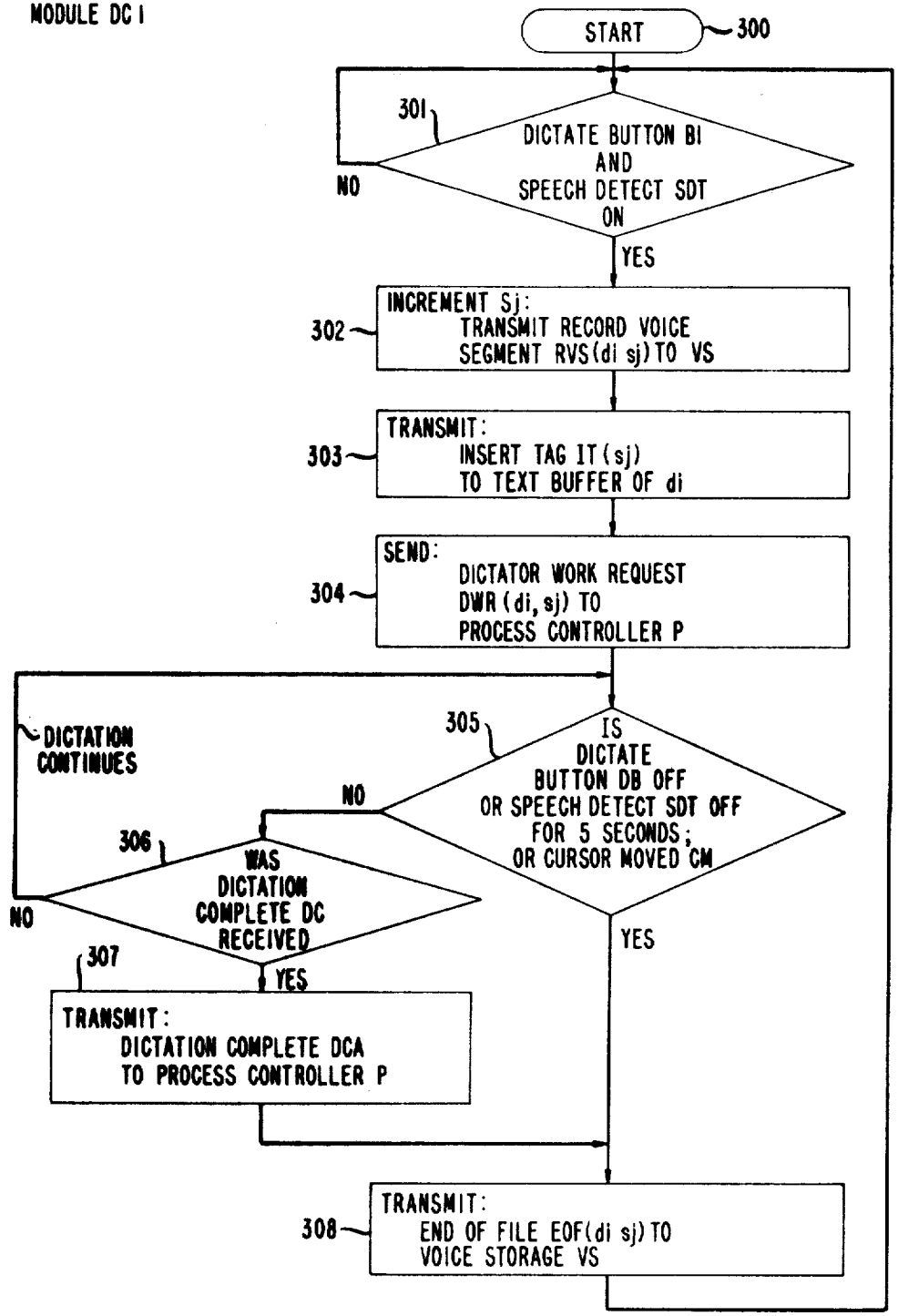
FIG. 3 shows the operating sequence of a dictate control module.

In step 303 of FIG. 3, an insert tag IT(sj) signal is transmitted to the text buffer TB1 of CRT1 to identify the location on the video terminal where the resulting text is to be displayed. In step 304 dictate control module DC1 sends a dictator work request signal DWR(di,sj) to process controller P in response to signals DB and SDT from dictator terminal D1.

Process controller P uses DWR(di,sj) to assign the dictation to a transcriber location, as described below, and causes a switch connection in 202 between that transcriber location and the speech digitized voice file DVF(di,sj) in voice storage VS. Note, voice storage VS is arranged such that an effectively simultaneous read by a transcriber and a write by a dictator can occur.

Thus dictation continues, steps 305 and 306, until one of four dictation termination events happens. In the event that the dictator stops dictating and releases dictate button B1 signal DB becomes logic 0 causing an end of file EOF(di,sj) signal to be sent, step 308, to voice storage VS. Voice storage VS, in turn, closes the digitized voice file DVF(di,sj). Subsequent dictation will be put in other files. Alternately, when the dictator stops dictation speech detector signal SDT becomes logic 0. If speech stops for 5 seconds an EOF(di,sj) signal is generated from step 308. (Alternatively, the 5 second limit can be set to any time criterion found to be consistent with dictation habits.) Similarly, in step 306, if the dictator has completed his dictation and presses the appropriate key on key pad K1 a dictation complete signal DC of logic 1 causes an EOF(di,sj) signal, step 308. In this condition the dictate module also sends a dictation complete DCA signal to process controller P, step 307. Finally, if the dictator presses an appropriate key on key pad K1 to move the cursor, a cursor moved signal CM of logic 1 causes an EOF(di,sj) signal from step 308. After an EOF(di,sj) signal is generated dictate control module DC1 returns to step 301.

As noted previously, the disclosed dictation/transcription system has the interactive ability to allow the dictator to be modifying the existing displayed dictation text while transcription is still in progress. Thus, the dictator can move the cursor to either add, delete or change existing text. The location of the cursor denotes the position on the video display to insert or delete text. These modifications to the displayed text can be done using the CRT1 keyboard. Additions to the text can also be made by dictation. Since the text buffer of the dictation terminal has a tag IT(sj) associated with each segment of dictation, the system can direct video terminal CRT1 to display each transcribed segment of dictation at the proper location. The disclosed tagging arrangement enables transcribed speech to be placed anywhere on the display including in the middle of existing displayed text. Additionally, the keyboard capabilities of the video terminal CRT1 enables various text handling capabilities which the dictator can utilize. Thus, the dictator may type in the change directly on video terminal CRT1 or dictate into microphone M1 and have the transcribed dictation inserted at the appropriate location in the displayed text. Furthermore, the dictator can command the terminal to send the message that was just transcribed to another terminal. Thus, an electronic mail arrangement with a voice signal input and a video text display output is contemplated. A typical terminal for this type of application is the Delta Data Systems 7300 terminal referred to earlier.

Additionally, depending on the desired sophistication of the disclosed system, partially completed dictation can be stored not only in text buffer TB1 of CRT1 (in FIG. 1) but also in common text storage TS. Furthermore, existing well known printer terminals (not shown) can be included in the arrangement and utilized to create a hard copy of the text displayed on the video terminals.

TRANSCRIBE CONTROL MODULE TC1

With joint reference to FIG. 1 and FIG. 4, the operating sequence for transcribe control module TC1 is described in the following paragraphs. As noted in FIG. 2, the disclosed arrangement utilizes one transcribe module (TC1-TCM) for each transcriber (T1-TM). While the operation of transcribe module TC1 is described herein it is identical to the operation of all other transcriber modules TC1-TCM.

Referring to FIG. 1, the operation begins when a transcriber at transcribe terminal T1 turns the ON/OFF switch "on". A corresponding on signal, TON, is outputted from terminal T1 to transcribe module TC1 over lead 107. Referring to FIG. 4, receipt of TON, step 401, causes transcribe module TC1 to transmit a transcriber present TP signal, step 402, to process controller P. In step 403 and 407 transcribe module TC1 waits for a speech waiting signal SW from process controller P, indicating that the T1 has been connected to a speech segment in VS (as described later). The wait for a speech waiting SW signal continues through the loop formed by steps 403, 407 unless the transcriber turns ON/OFF switch "off". If a transcriber "off" signal is received, step 407 then transcribes module TC1 sends a transcriber bye TB signal, step 408, to process controller P. Thereafter, as shown in step 401, the process can be repeated by another transcriber "on" signal.

Figure 11:
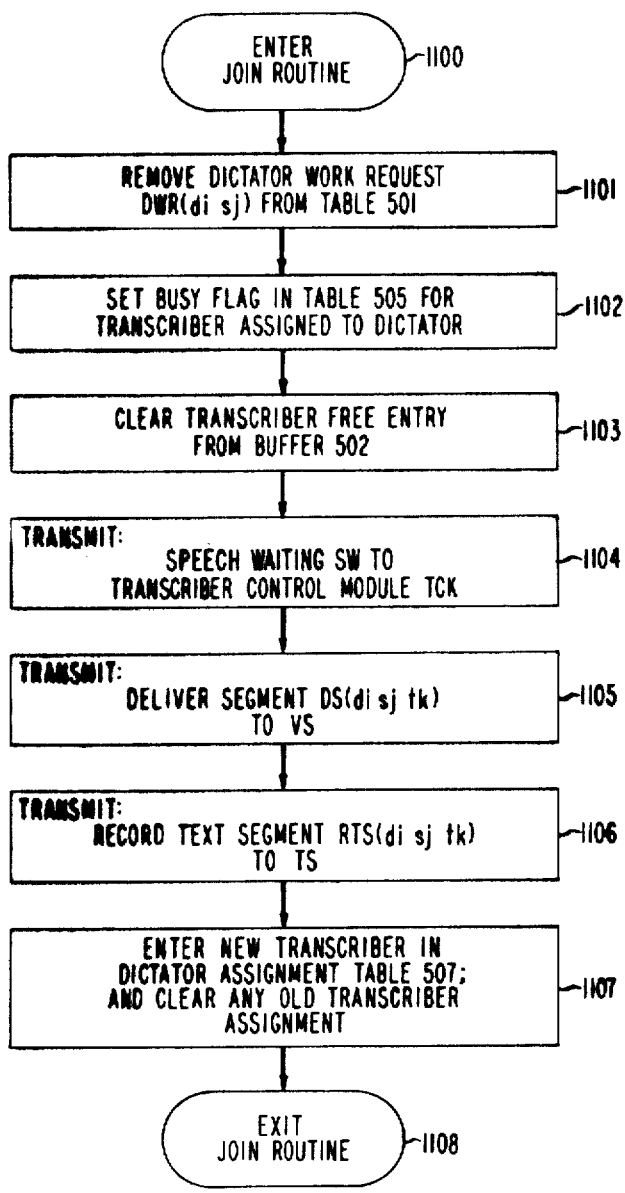
FIG. 11 shows the operating sequence for a join routine which updates tables and buffers, and transmits control signals.
Figure 12:
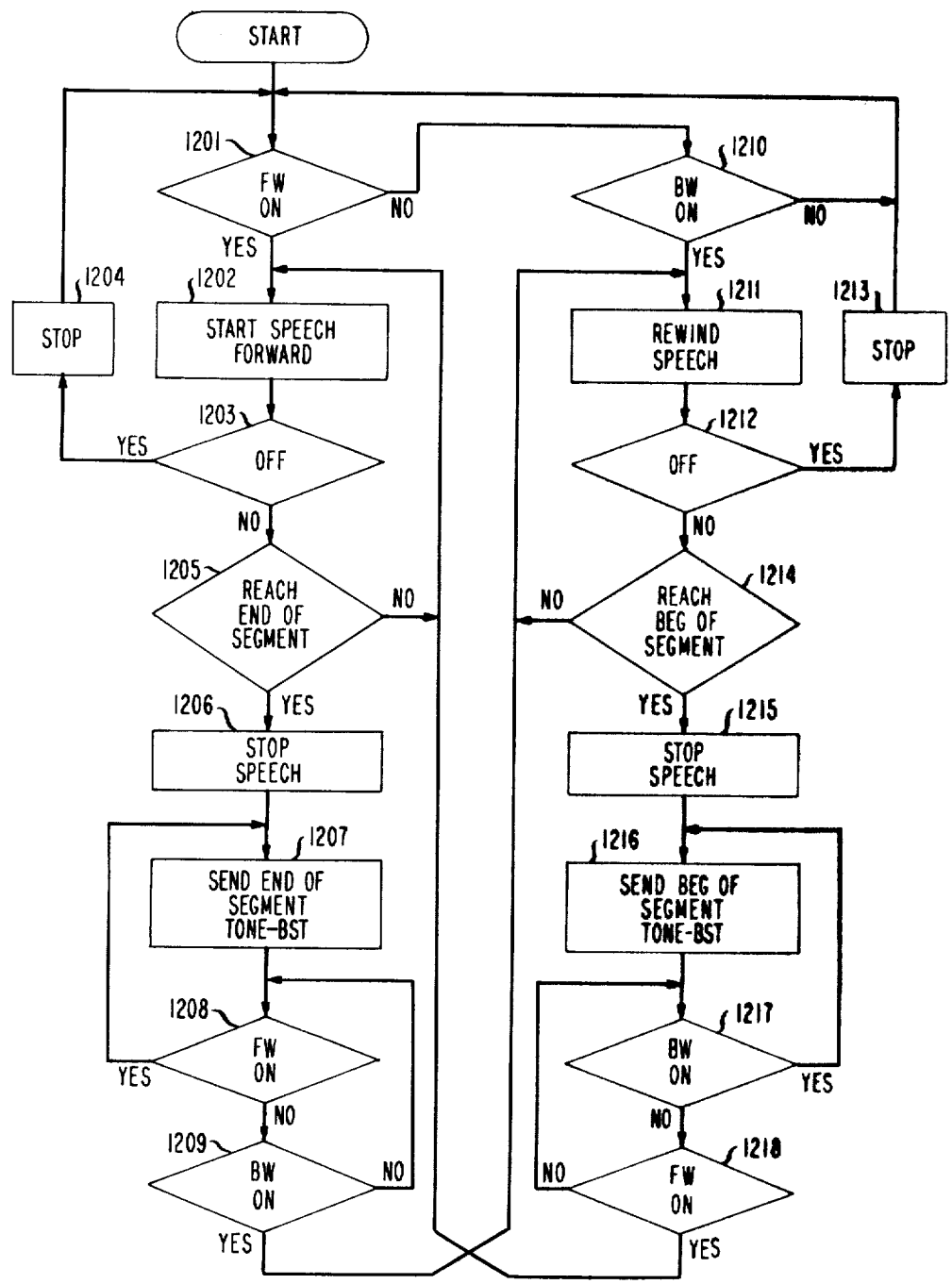
FIG. 12 shows the operating sequence of a voice playback module.

If, on the other hand, a speech waiting signal SW is received from process control P, step 403, then the transcribe module sends a speech waiting tone SWT, step 404, to voice unit D/A1 a transcriber terminal T1, telling the transcriber that a segment is waiting to be transcribed. The module then waits for the transcriber to press the segment done button SD, step 405. Meanwhile, the transcriber can play back and transcribe speech. This is because, as explained below (cf. FIG. 11), the process controller P sent the speech waiting SW signal after commanding the voice storage unit VS by a deliver segment DS(di,sj,tk) signal to transmit a speech file to the transcriber terminal under control of the transcriber's foot pedal (F1); and also sent signal RTS(di,sj,tk) to text storage TS causing TS to open a text file TF(di,sj) of text from T1. The control routine initiated by the DS(si,sj,tk) signal is shown in FIG. 12. This routine, called a "voice playback module", runs in the control unit 205 of voice storage VS.

Operations of the voice playback module is as follows. This subroutine first checks whether transcriber T1 has pressed foot switch F1 (of FIG. 1) to the forward position (step 1201). Assuming switch F1 was in forward position FW speech would start to flow, step 1202, from voice memory VS to voice unit D/A1. If foot switch F1 is released by transcriber T1, step 1203 and 1204, speech stops and control returns to step 1201 again. If transcriber T1 has not released foot switch from the FW position speech continues in a cycle through steps 1205, 1202, 1203. When the end of the segment is reached the speech is stopped at step 1206 and end of segment tone EST is sent to transcriber T1. Transcriber T1 continues to receive the end of segment tone EST so long as foot switch F1 is in the FW position (steps 1208, 1207). Once foot switch F1 is released and is neither in the forward FW position nor in the backward BW position, steps 1208 and 1209, a wait or pause results. In this pause condition transcriber T1 can rewind, steps 1209 and 1211, to review the dictation.

Note, transcriber T1 can press the DONE button during any phase of the subroutine. As explained below, this will cause process controller P to terminate the speech segment.

Returning to step 1201, assuming that transcriber T1 did not press foot switch F1 either to the forward FW position or to the backward BW position a wait state results via steps 1201 and 1210. If transcriber T1 has pressed foot switch F1 to the backward BW position a "rewind" of the speech segment would occur in step 1211. Note this rewind step 1211 results also from the transcriber desiring to review the speech after step 1209. If foot switch F1 is released from the backward BW position, the rewinding is stopped in step 1213, and control returns to step 1201. Otherwise, the rewind process continues until the beginning of the segment is reached, step 1214, at which time speech is stopped, step 1215, and a beginning of segment tone BST is outputted to the transcriber T1 (step 1216). At this point in time if transcriber T1 does not touch foot swtich F1 a wait condition, step 1217 and 1218, results. If transcriber T1 presses foot switch to the backward BW position the beginning of segment tone would continue to be given at step 1216. More likely, after a rewind is complete transcriber T1 will press foot switch F1 to the forward FW position and speech is outputted, step 1202, to transcriber T1.

Figure 4:
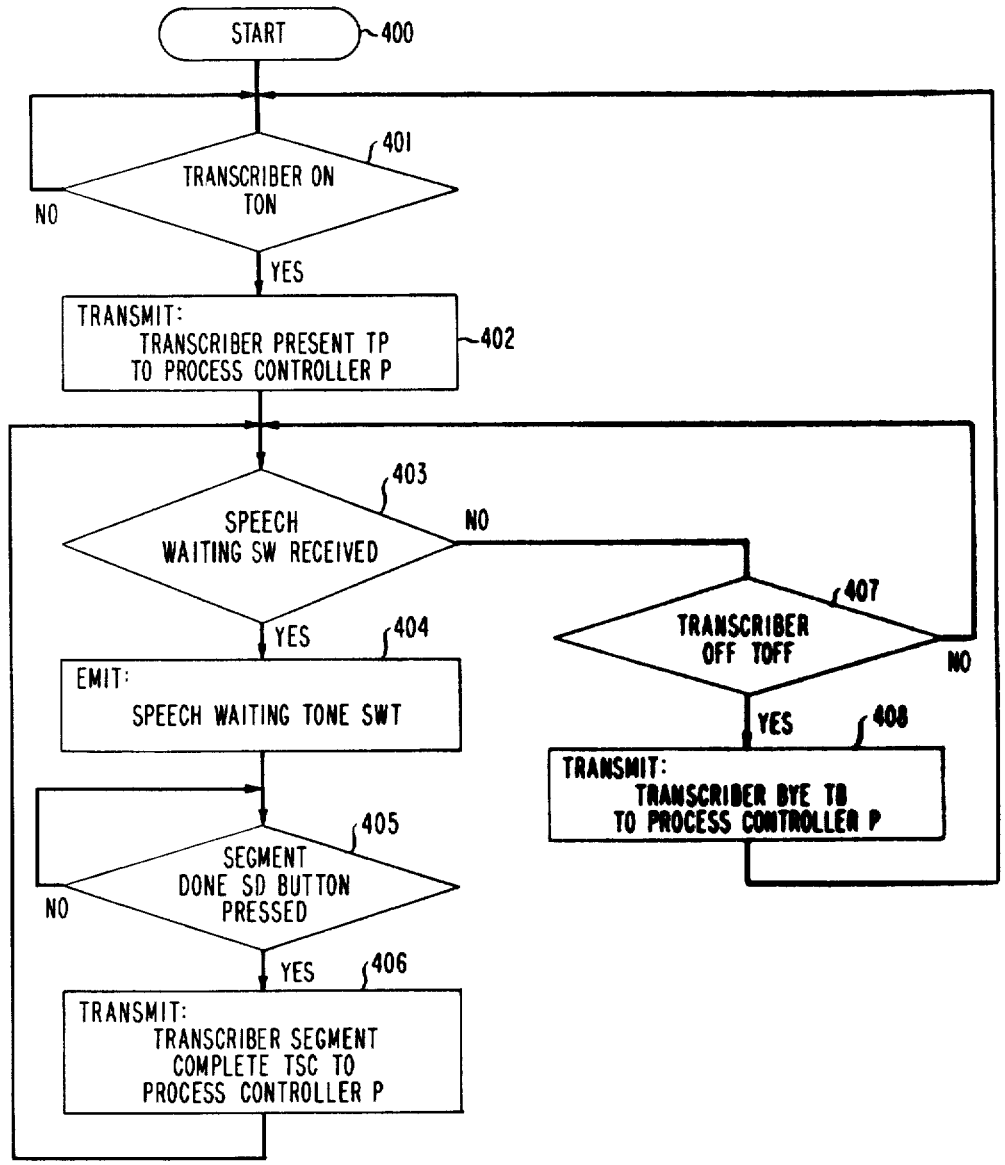
FIG. 4 shows the operating sequence of a transcribe control module.

Note, referring to FIG. 4, while the transcriber is transcribing, transcriber module TC1 is awaiting in step 405 the segment done SD signal. After the segment done SD signal is received, transcribe module TC1 sends a transcriber segment complete TSC signal, step 406, to process controller P indicating that the transcriber has completed the transcription of the dictation segment. As explained in connection with FIG. 6, process controller P in turn sends a remove transcriber RT(ti) to voice storage VS which causes VS to stop operation of the voice playback module, FIG. 12 and sends an end text segment ETS(tk) signal to text storage TS which closes the corresponding text file. Transcribe module TC1 returns to steps 403, 407 and awaits another speech waiting SW signal from process controller P.

Process Controller P and Associated Status Tables

The operation of process controller P requires keeping track of the status of various dictator and transcriber activites. Shown in FIG. 5 are the various tables and buffers including dictator work request 501, free transcribers 502, input buffer 503, transcriber present 504, transcriber busy 505, dictation complete 506, transcriber to dictator assignment 507 and done times 508. The entries in buffer 502 and 503 are handled in a first in first out sequence. Entries in table 501 collect in order of entry, but can be read and deleted in any sequence. Entries in tables 504, 506, 507, 508 can be entered, read, and deleted in any order. The entries in the various tables are identified as follows: d1 identifies dictator 1, t1 identifies transcriber 1 and s1 identifies dictation segment 1. The operation of the tables and buffers will be discussed in conjunction with the operating sequence of process controller P. The operational sequence of process controller P is shown in FIG. 6. The following description makes joint reference to FIGS. 5 and 6.

Initialization and Input

After start up, the processor is initialized in step 601, buffers 501–503 and tables 504–508 are cleared and pointers are reset. The process controller P waits, step 619, for one or more new entries in the input buffer 503. These entries can come from any of the dictate or transcribe control modules. When the entry is found, it is read, step 602. Input buffer 503 is a first in/first out; after each entry is read it is cleared from the buffer. If the entry is a dictation request 605, it is entered into dictator work request DWR table 501, step 606, the corresponding dictation complete flag (506) is cleared, step 618, and the next read cycle 602 starts. If the entry is a dictation complete DCA signal from a dictator (607, 608), a flag is entered in the slot of table 506 associated with that dictator. If the entry is a transcriber present signal TP from a transcriber (609, 610) a flag is entered in the slot in table 504 associated with that transcriber. Additionally, the present time is set in done time table 508. If the entry is a transcriber bye signal TB (611, 612), the associated transcriber entries are removed from all tables and buffers (504, 505, 507, 502) except for subsequent entries in the input buffer of course. If the entry is a transcriber segment complete TSC (613, 614, 615, 616, 617), a remove transcriber RT(tk) signal is sent to voice storage VS, an end text segment ETS(tk) signal is sent to text storage TS, the done time Xk signal is placed in table 508, the associated transcriber busy flag is removed from table 505 and the next read cycle 602 starts. If the entry was not a transcriber segment complete TSC entry, the next read cycle 602 starts (there should not be other entries, so actually an error report could be inserted here).

Figure 5:
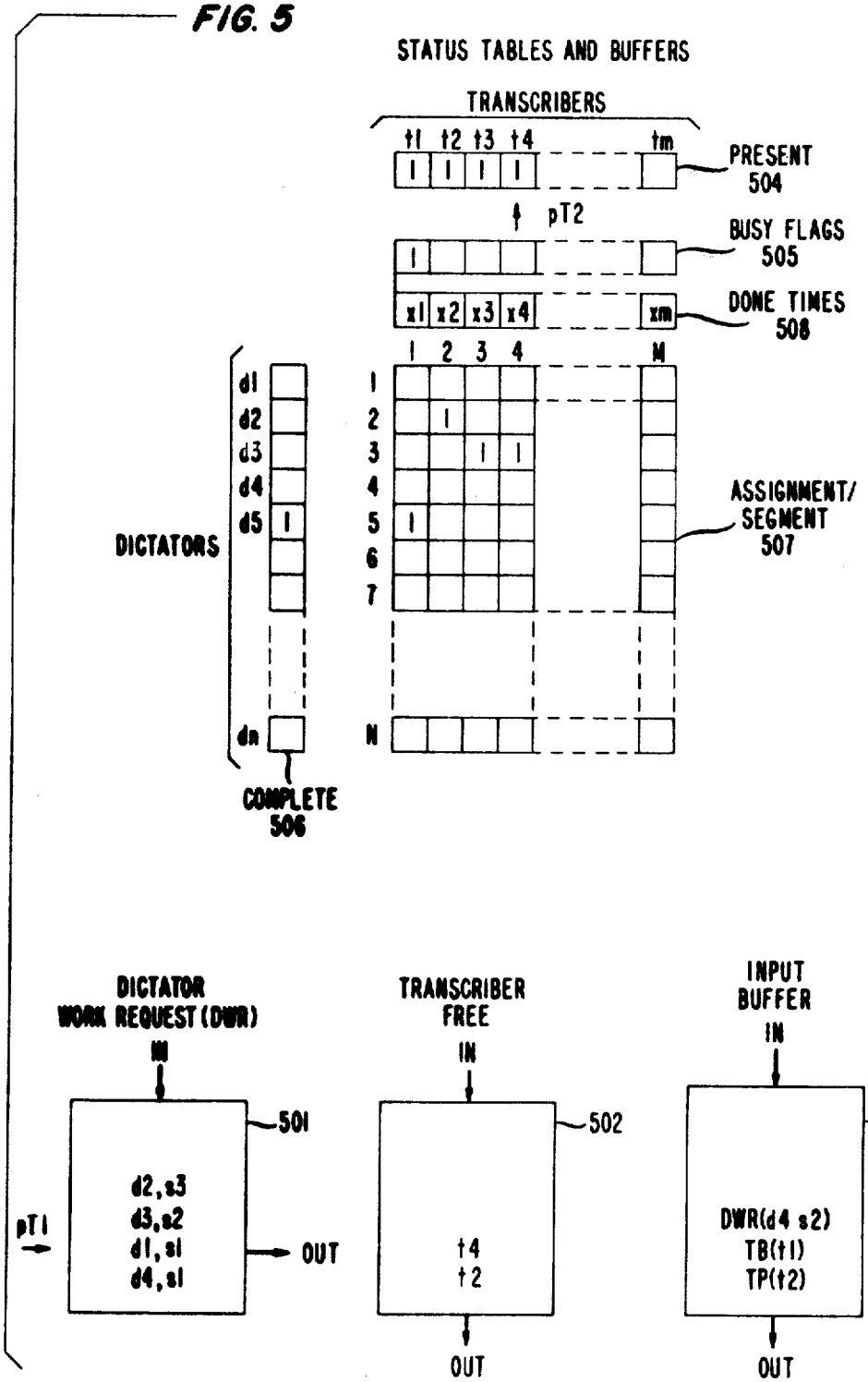
FIG. 5 shows the various status tables and queues used by the main controller.
Figure 6:
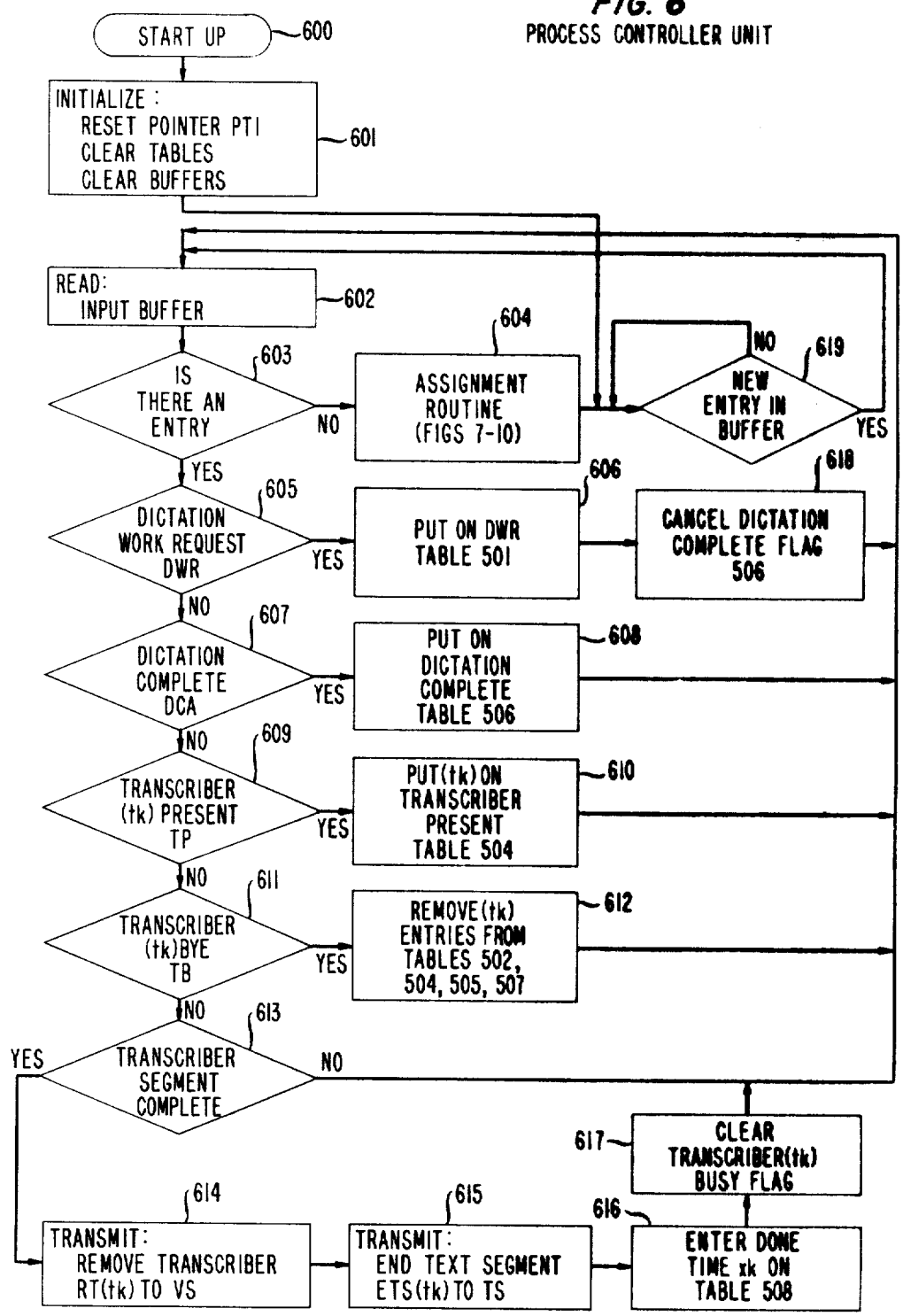
FIG. 6 shows the operating sequence for an input to the process controller.

Thus, referring to FIG. 5, the process controller is constantly transferring entries from input buffer 503 into the appropriate tables or buffers. For example, after reading the first entry TP(t2), the entry is removed from the input buffer and, in steps 609 and 610, a flag (logic 1) would be set at location t2 of transcriber present TP table 504. Entry TB(t1) is then handled by process controller P. This entry is a transcriber "bye" TB message from transcribe controller TC1 indicating that transcriber t1 has turned its on/off switch "off". Thus, transcriber t1 is unavailable for future assignments and process controler P would (step 611, 612) delete entries corresponding to this transcriber from tables 504, 505, 507, 502. In such a situation transcriber t1 is unavailable and any future dictation inputs would be handled only by the transcribers presently available, namely, transcribers t2, t3 and t4 as indicated in table 504.

Finally, the entry DWR(d4,s2) is read. This entry indicates to process controller P that dictator d4 requests that a second segment s2 of dictation be transcribed. This entry was received by process controller P via dictator control module T4 as a dictate work request DWR(d4,s2). Process controller P enters this entry into dictate work request table 501 behind request entry d2, s3. After completion of this request there are no other entries in input buffer 503. Thus, after step 603, process controller P proceeds with step 604 performing the assignment routine of FIGS. 7 through 10.

Assignment Routine

With reference to FIGS. 5 and 7-10 the assignment routine is described in the following paragraphs. The purpose of the assignment routine is to assign segments of dictation to transcribers according to a set of priority rules. Additionally, the assignment routine transmits signals to the transcribe modules (T1-TM) and to the voice and text storage units VS and TS to implement the assignments so determined. The assignment routine can be one which randomly assigns transcribers to dictators or which assigns transcribers to dictators on a first-come first-served basis. The assignment routine could likewise utilize well-known resource allocation or priority rules. The priority rule selected for a particular application will depend on many criteria. The priority rules utilized herein are merely illustrative of one embodiment of the assignment routine.

The disclosed priority order is to first assign dictation segments from dictators who have no assigned transcribers (table 507). Within this group of dictators an attempt is made to assign each dictator to transcribers who are free (table 502) and then to transcribers who have completed a segment [that is those transcribers present (table 504) that are not busy (table 505)]. Subsequently, dictation segments are assigned from dictators who do have assigned transcribers (table 507). Within this group of segments an attempt is made to first assign transcribers to dictators with no typing in progress; each such dictators are given the transcriber who last worked for him or her. (This has the desirable effect of increasing the probability that a transcriber will work on successive segments from a given dictator). Finally, any non-busy transcribers (assigned or unassigned) are assigned to dictators whose present assigned transcribers are all busy.

The assignment routine shown in FIGS. 7 through 10 includes several interconnected subroutines. One subroutine, FIG. 7, locates free transcribers while another, FIG. 8, assigns segments for dictators who do not have assigned transcribers. Another subroutine, FIGS. 9 and 10, assigns the transcription of dictators that have assigned transcribers. Finally, the join subroutine in FIG. 11 sets the transcriber busy flag and sends various control signals.

Figure 7:
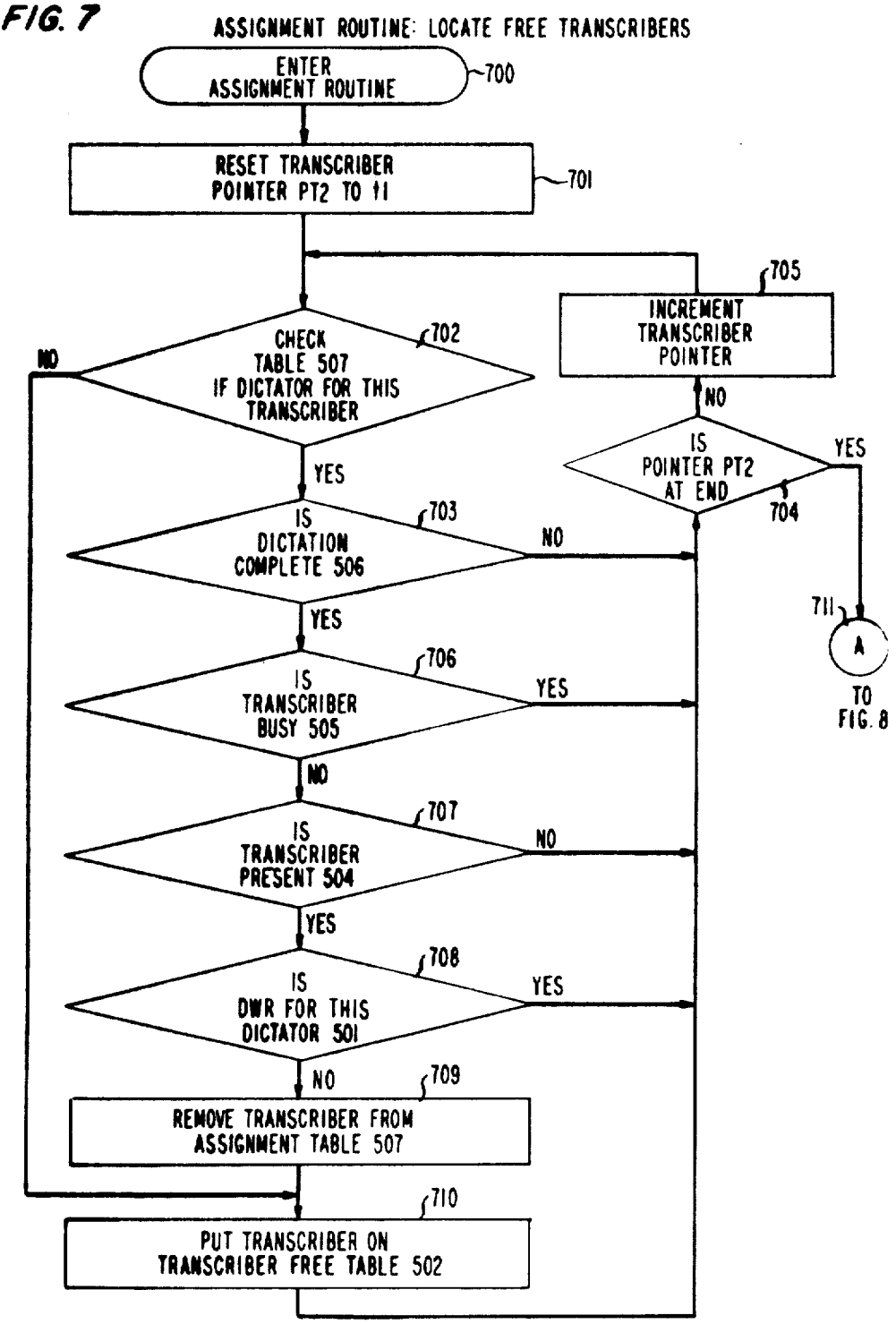
FIG. 7 shows the part of the operating sequence of an assignment routine which locates free transcribers.

Referring jointly to FIGS. 5, 6 and 7, the assignment routine is entered, step 700, when no entries exist in input buffer 503 as shown by step 603 and 604 of FIG. 6. FIG. 7 shows how "free transcribers" are found. In step 701 transcriber pointer PT2 is set to t1. Table 507 is checked, step 702, to see if a dictator is assigned to transcriber t1. If no dictator is assigned, transcriber t1 is put on the transcriber free table step 710, and step 704 is accessed. Step 704 checks whether the pointer has cycled through all of the existing transcribers tm shown in assignment table 507. If the response is affirmative a subroutine exit 711 results. If transcriber pointer indicates that other transcribers need to be checked the pointer is incremented in step 705 and the process repeats. If, on the other hand, in step 702, a dictator is assigned, then further tests 703-708 are made. Given proper answers to these tests, the transcriber is removed from the assignment table, step 709, and put on the transcriber free table, step 710, and step 704 is accessed. Otherwise, 704 is accessed directly.

Suppose, for example, it is shown in assignment table 507 that transcriber t1 (column 1) is assigned to dictator d5 (row 5). In this example the result of decision block 702 is in the affirmative and a decision block 703 is addressed. (If no entry exists in the dictation complete table 506, not the case in our example, step 704 would be addressed.) Also, a logic 1 exists for dictator d5 in table 506, so the response to step 703 is affirmative (yes) and step 706 is addressed. Since, as shown in table 505, transcriber t1 is busy it obviously cannot be considered for entry in the transcriber free table 502. Thus, the yes response to step 706 results in incrementing the transcriber pointer in step 704.

If transcriber t1 had not been busy, step 707 would be performed. Step 707 checks table 504 to determine whether transcriber t1 is present and available for transcription. If no logic 1 is present in the entry under transcriber t1 step 704 is addressed. If transcriber t1 is present, as indicated by a logic 1 flag, then step 708 is addressed. Step 708 checks whether transcriber t1 presently has a dictation work request (DWR) waiting. A dictation work request exists when dictator (d5) is listed as having another dictation segment to be transcribed. In such a situation it is desirable to have the same transcriber (t1) continue to handle the dictation from dictator d5 instead of being considered free for other dictators. However, since no dictation work request (DWR) exists in table 501 for dictator d5, transcriber t1 is placed, in step 710, on the transcriber free table 502. Transcriber t1 is also removed, step 709, from an assignment to dictator d5 in assignment table 507. After completion of steps 709 and 710, the transcriber pointer PT2 is advanced in steps 704 and 705. As noted earlier, the previous sequence is completed for each transcriber t1 through tm after which the subroutine is exited in step 711. The result of the subroutine shown in FIG. 7 is that the transcriber free table 502 and assignment table 507 have been updated with the latest change in status of the transcribers.

Figure 8:
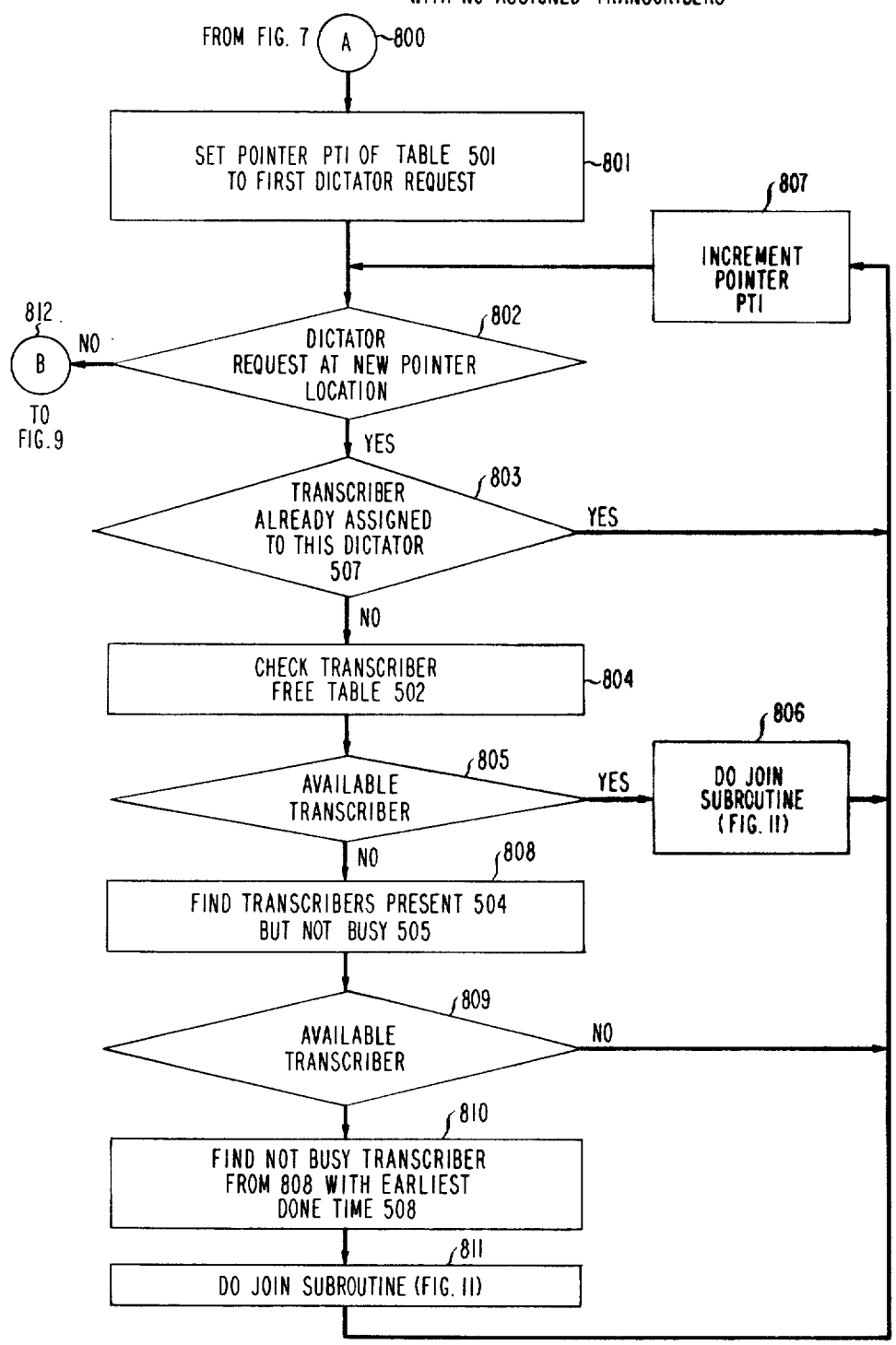
FIG. 8 shows the part of the operating sequence of the assignment routine which assigns segments for dictators with no associated transcribers.

When subroutine FIG. 7 is exited at step 711, the subroutine of FIG. 8 is entered at step 800. The following description makes joint reference to FIG. 5 and FIG. 8. The subroutine of FIG. 8 basically assigns transcribers to service requesting dictators who do not now have assigned transcibers. In step 801 pointer PT1 is set to the first dictator work request (d4, S1) entry in table 501.

Step 802 checks whether there are any dictator work requests in table 501. If there are no dictator work requests the subroutine is terminated and exits at step 812. If there is a dictator work request assignment table 507 is checked, in step 803, to find if there is a transcriber assigned to the requesting dictator. If the requesting dictator has an assigned transcriber, service for the work request is deferred; the pointer is incremented in step 807 and the next dictator work request entry in table 501 is checked in step 802. In step 803 if there is no transcriber assigned to the dictator that originated the current work request, the transcriber free table 502 is checked in steps 804 and 805 and a join routine is done, step 806, if one is found. This happens in our example, as dictator d4 of work request d4,S1 (table 501) does not have a transcriber assigned (table 507), and a free transcriber t2 exists (table 502). Thus, a join subroutine, step 806, is performed to associate the free transcriber t2 with the requesting dictator d4, segment s1. The join subroutine is shown in FIG. 11 and will be described in a subsequent paragraph.

After the join subroutine is completed the pointer is incremented, step 807, and the next dictator work request handled. Assuming that in step 805 there was no transcriber available, step 808 would compare all those transcribers present in table 504 against those transcribers that are busy in table 505. All transcribers listed as present in table 504 but is not busy in table 505 must have completed a segment of transcription and are now available for reassignment. Of these, the transcriber with the most recent done time is reassigned in steps 810 and 811. If the above search does not yield a transcriber this unserviced entry remains in dictator work request table 501 and the pointer is incremented in step 807. The subroutine shown in FIG. 8 always terminates ultimately in exit step 812 at which time the remaining dictate work requests DWR of table 501 are handled by the subroutine shown in FIG. 9.

Figure 9:
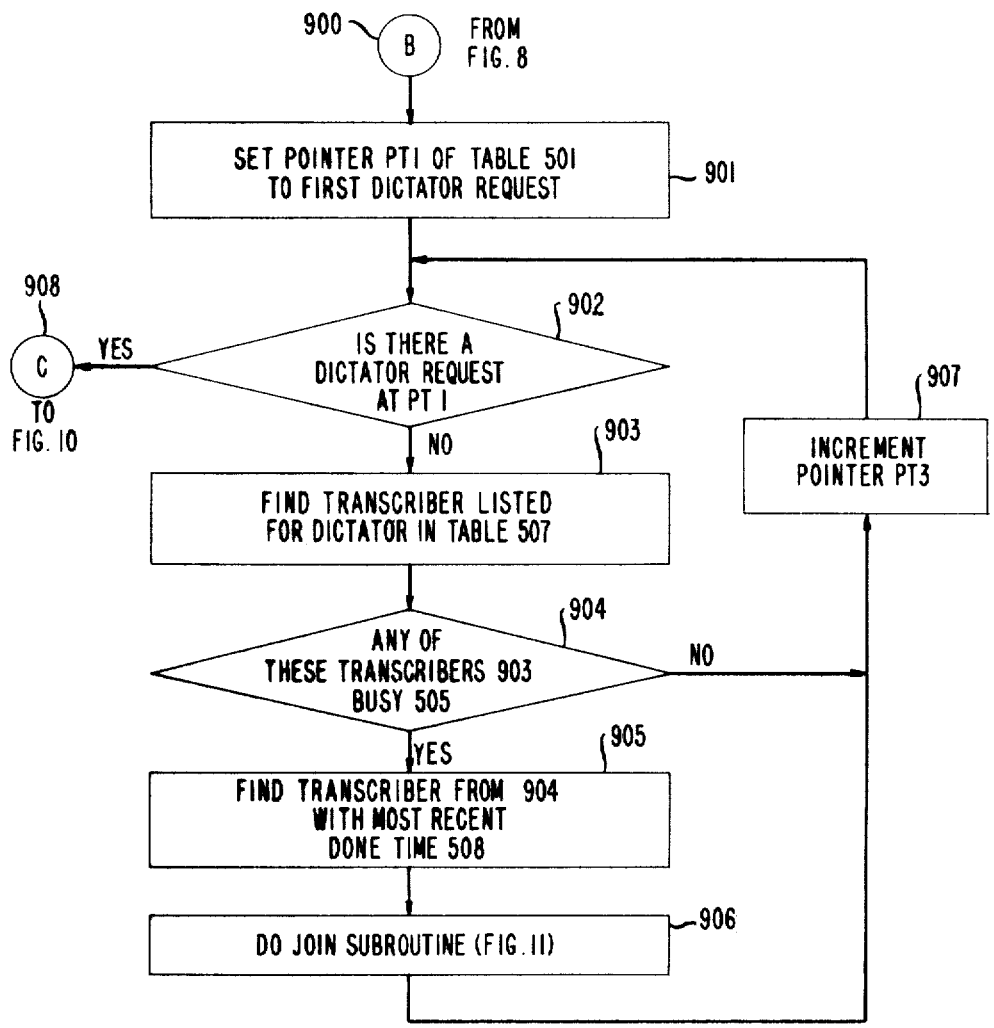
FIG. 9 shows the part of the operating sequence of the assignment routine which assigns segments for dictators with an assigned non-busy transcriber.

The subroutine shown in FIG. 9 will be described in conjunction with FIG. 5. This subroutine basically assigns the latest dictation segment of a dictator to transcriber that was previously assigned to him or her, provided that the transcriber is not busy. After entry step 900, pointer PT1 of table 501 is reset in step 901 and entries in table 501 are checked (step 902). If no dictator work requests exist an exit from the subroutine is made at step 907. If a dictator work request exists a check is made, step 903, in table 507 for the assigned transcribers. If any of the assigned transcribers are not busy, the transcriber with the most recent done time is found, 905, and the join routine is performed, 906, after which the pointer is incremented in step 907. Ultimately after all the requests of the dictator work request table 502 have been handled the subroutine exits at step 908 to the subroutine of FIG. 10.

Figure 10:
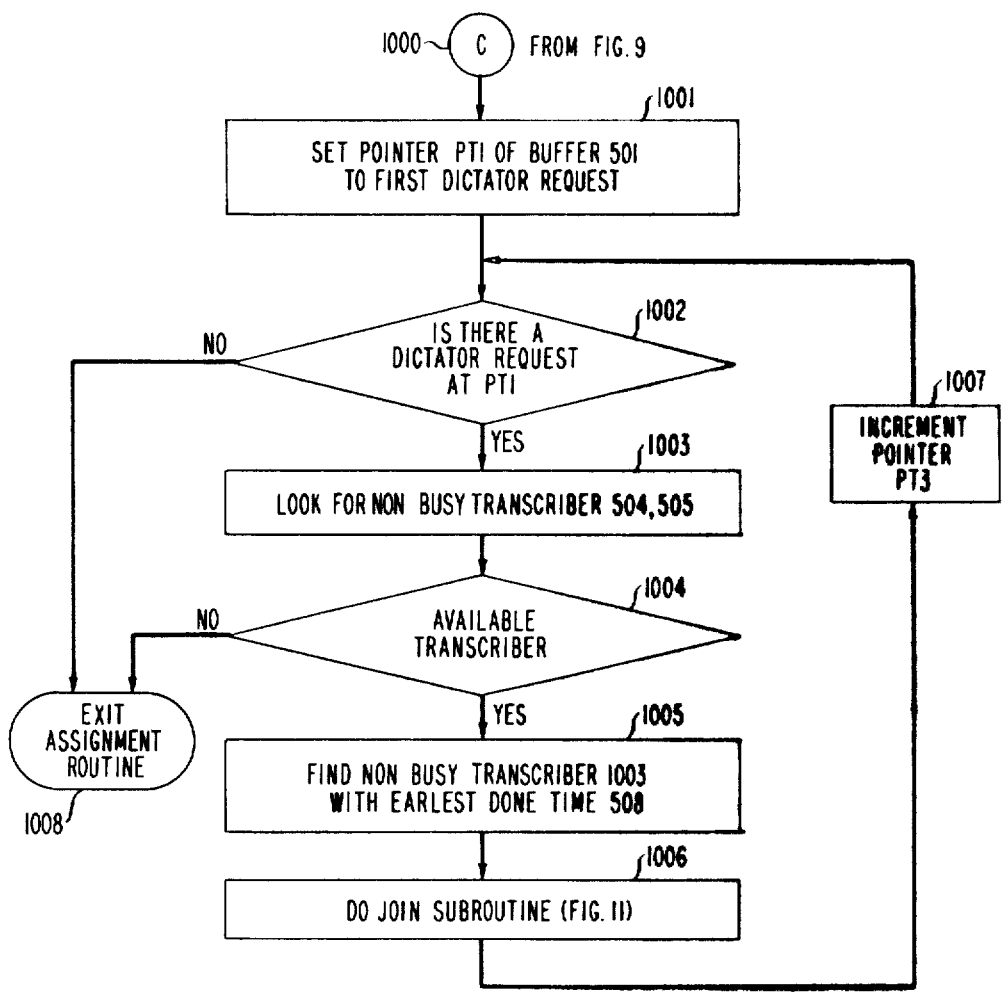
FIG. 10 shows the part of the operating sequence of the assignment routine which assigns segments for dictators with busy transcribers.

The description of the subroutine shown in FIG. 10 jointly references FIGS. 5 and 10. Basically the subroutine of FIG. 10 assigns segments for dictators who already have assigned transcribers. This subroutine is entered in step 1000 from the exit step 908 of FIG. 9. Again, pinter PT1 of dictator work request table 501 is reset. If a dictator work request does not exist in table 501 a subroutine exit is made via steps 1002 and 1008. If a dictator request exists then unbusy (505) and present (504) transcribers are sought in step 1003. Optimally, this selection would be made first from the free (unassigned) transcribers and then from the remaining, assigned transcribers. If any are found, step 1004, the one with the earliest done time is assigned, step 1005, and the join subroutine, step 1006, is performed. Otherwise the routine exits, step 1008. Finally pointer PT1 is incremented in step 1007 and the next dictator work request entry of table 501 is checked.

The exit of this subroutine, step 1008, returns control to steps 619, 602 of FIG. 6 to read the input buffer for new entries as described previously.

Join Routine

The description of the join subroutine referred to in the subroutine of FIGS. 8 through 10 will now be described with joint reference to FIGS. 5 and 11. The subroutine is entered in step 1100. In step 1101 the dictator work request entry presently being handled is deleted from table 501 (and any entries below it are moved up to fill the resulting blank). In step 1102 a busy flag is set in table 505 for the transcriber currently assigned to this dictation work request. Thereafter, in step 1103 the assigned transcriber's transcriber free entry of table 502 is cleared. In step 1104 a speech waiting SW signal is sent to transcriber control TCk. Transcriber control TCk is the transcriber module which services terminal Tk at which the assigned transcriber tk transcribes. As previously described, in the transcribe control module a SW signal received from process controller P causes a speech waiting tone (SWT) to be sent to the associated transcriber terminal Tk. Then, in step 1105 a deliver segment DS(di,sj,tk) signal is sent to voice storage VS, via lead 116, instructing VS to send the digitized voice segment DVS(di,sj) to transcriber tk under control of the associated foot pedal (as described in FIGS. 4 and 12). Note variable di is the dictator number and sj is the segment number of the dictator work request DWR(di,sj) of table 501 which is currently being assigned. Transcriber number tk is the transcriber assigned to dictator di by the routine of FIGS. 8, 9, and 10. Then, in step 1106, a record text segment RTS(di,sj,tk) is sent via lead 114 to text storage TS, instructing TS to open a text file TF(di,sj) for input from transcriber tk.

Finally in step 1107 a logic 1 entry is made at the coordinates di,tk of assignment table 507, and any other assignments are cleared. Thus, transcriber tk is assigned to dictator di in table 507. It is to be noted that other entries such as a voice segment identifier sj can be stored in assignment table 507. After this assignment the join subroutine is exited in step 1108 and control is returned to the subroutine which called the join subroutine.

Text Distribution Module

The contents of the text files are distributed to the dictation terminals as follows. At any time, one or more segments may be being transcribed for a given dictator. These segments must be inserted at different points in the text stored in the dictators terminal, at the location specified by the corresponding tags. The tags were previously inserted by transmitting an IT(sj) signal or command to the terminal. IT(sj) can simply command the terminal to insert a special string of characters in the text (a string corresponding to sj). Text is then inserted at the tag position by preceding it with an insert at tag command IAT(sj). IAT(sj) can simply command the terminal search for the previously inserted tag and insert the text that follows, up to a terminator TT transmitted at the end of the text. Note, this capability of inserting and searching is within the capability of commercially available terminals (e.g., the model 7300 terminal manufactured by Delta Data Systems, Cornwall Heights, Pa.). Note, if it is necessary to move the cursor in response to the IT(sj) or IAT(sj) signal, a mark should be left in the text before the cursor is moved and the cursor should be returned to the mark after signals are inserted. Also, any control signals CC that take place during this operation should be queued until after the IT(sj) and IAT(sj) signals are processed.

Figure 13:
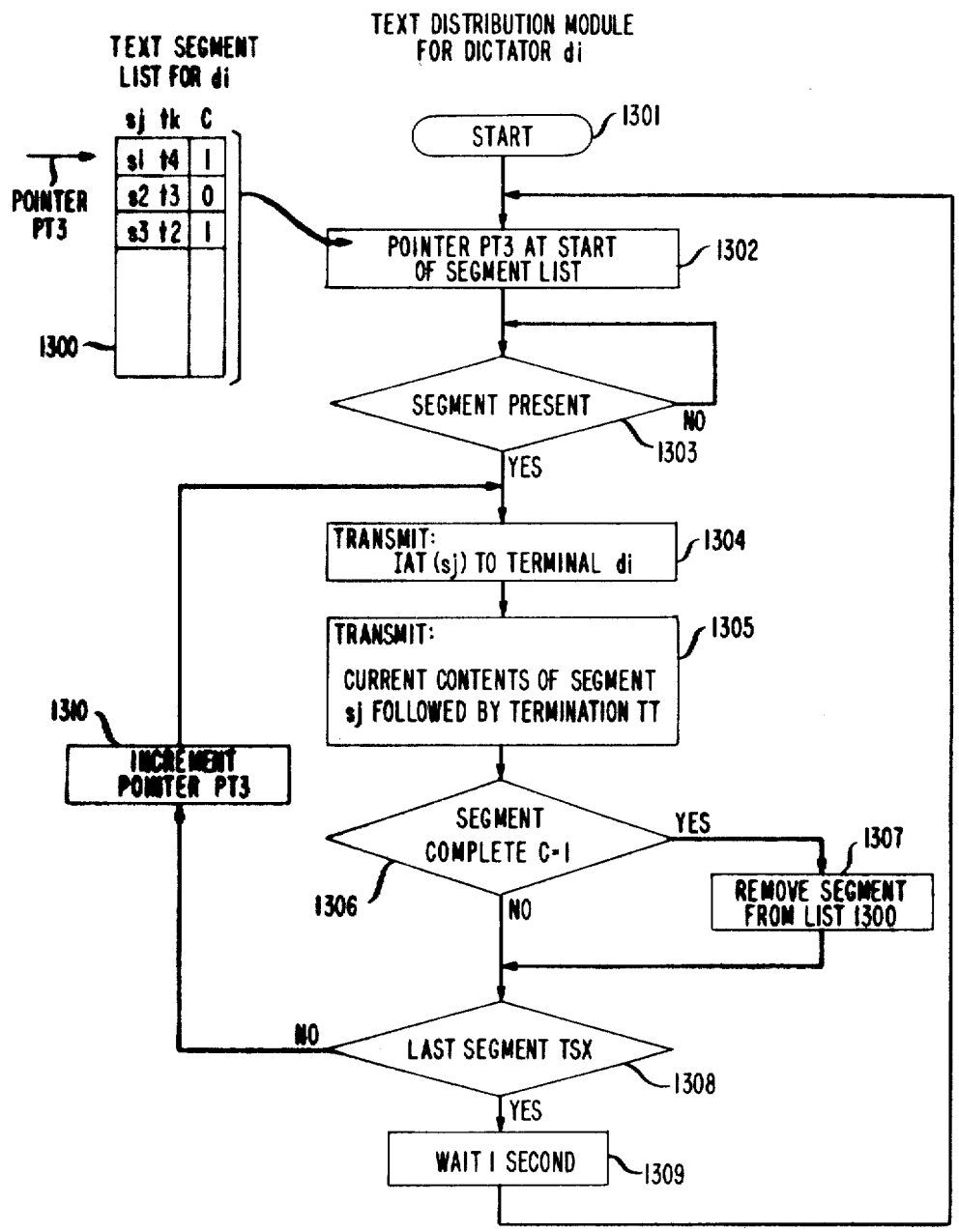
FIG. 13 shows the operating sequence of a text distribution module.

This insertion of text segments is done by the text distribution module shown in FIG. 13, which is always running. The module starts, steps 1301, 1302, and 1303, by setting a pointer (PT3) to the beginning of a segment list 1300 and waiting for an entry to be present. Entry (sj,tk) is added to this list by the text storage control unit 205 whenever it opens a text file TF(di,sj) in response to a record text segment RTS(di,sj,tk) from the join routine, step 1106. In other words, list 1300 is a directory commonly found in file systems. For example, for dictator d1 a text file is established and an entry is made in segment list 1300 when a record text segment signal (RTS(d1,s1,t4) of FIG. 1) is received by the control unit of text storage systems TS. Segment list 1300 shows that three entries or voice dictation segments have been received from dictator d1 and assigned to various transcribers. In addition, a transcription complete flag is set in column C of list 1300, in the row containing tk, when an end text segment ETS(tk) is received from process controller P.

Once an entry is found an insert at tag command IAT(sj) is sent to dictation terminal, step 1304, and the contents of the text file TF(di,sj), followed by a terminator, are transmitted to the terminal (and removed from text storage TS), in step 1305. If C=1 for the text segment, indicating that the transcriber is done with the segment, the corresponding entry is removed from list 1300 in steps 1306 and 1307. Then, if the pointer is not at the last segment, step 1308, the pointer is incremented, 1310, and the next segment is treated the same way. If on the other hand the pointer was at the last segment on the list 1300, the routine waits 1 second (or some other convenient time) for additional text to accumulate, step 1309, and then starts over at step 1302.

It is to be understood that the embodiment of the disclosed dictation/transcription arrangement and the method of operating the arrangement as described herein are merely illustrative of the principles of the invention. A variety of modifications thereto may be effected by persons skilled in the art without departing from the spirit and scope of the invention.

What is claimed is:

1. A method of operating a dictation transcribing system characterized by the steps of:
   a. receiving voice dictation signals representing one or more spoken words from a dictation terminal,
   b. segmenting said dictation signals into time sequential voice dictation segments each consisting of one or more words,
   c. checking and storing in a done time table entries identifying the time when each transcriber terminal was available to receive transcribing,
   d. assigning and transmitting each sequential voice dictation segment to one of a plurality of transcriber terminals by selecting a transcriber terminal having the earliest time entry in said done time table,
   e. transcribing voice dictation segments into transcription signals at the assigned transcriber terminal and
   f. assembling the transcription signals from the transcriber terminals according to the segment assignments.

2. The method of claim 1 wherein said segmenting step (b) includes the step of:
   generating from the characteristics of said dictation signal a signal for segmenting the received voice dictation signals.

3. A method of operating a dictation transcribing system characterized by the steps of:
   a. receiving voice dictation signals representing one or more spoken words from a dictation terminal,
   b. segmenting said dictation signals into time sequential voice dictation segments each consisting of one or more words,
   c. assigning and transmitting the first voice dictation segment from a dictation terminal to any one of a plurality of transcriber terminals,
   d. storing said assignment as an entry in an assignment table,
   e. assigning and transmitting subsequent voice dictation segments from said dictation terminal to a non-busy transcriber terminal assigned to said dictation terminal in accordance with the entry in said assignment table and when said assigned transcriber terminal is busy assigning and transmitting to an unassigned transcriber terminal which assignment is entered in said assignment table,
   f. transcribing voice dictation segments into transcription signals at the assigned transcriber terminal and
   g. assembling the transcription signals from the transcriber terminals according to the segment assignments.

4. The method of claim 3 wherein said assigning step (c) includes the step of:
   assigning an unassigned transcriber terminal to a first voice dictation segment from a dictator terminal having no assigned transcriber terminal.

5. The method of claim 4 wherein said assigning step (c) further includes the steps of:
   determining the busy status of each assigned transcriber terminal in said assignment table and
   assigning a transcriber terminal to a voice dictation segment from a dictator terminal having no assigned transcriber terminal by selecting a non-busy transcriber terminal presently assigned to another dictation terminal.

6. The method of claim 5 wherein said assigning step (c) further includes the steps of:
   checking and storing in a done time table entries identifying the time when each assigned transcriber terminal is no longer busy transcribing and
   assigning a transcriber terminal to a voice dictation segment from a dictation terminal having no assigned transcriber by selecting a transcriber terminal having the earliest time entry in said done time table.

7. The method of claim 3 wherein said assigning step (e) further includes the step of:
   assigning a non-busy transcriber terminal presently unassigned or assigned to a second dictation terminal to a voice dictation segment from said dictation terminal when each transcriber terminal assigned to said dictation terminal is busy.

8. The method of claim 7 wherein said assigning step (c) further includes the steps of:

checking and storing in a done time table entries identifying the time when each assigned transcriber terminal is no longer busy transcribing and assigning a transcriber terminal to a voice dictation segment from a dictation terminal by selecting said non-busy transcriber terminal having the earliest time entry in said done time table.

9. The method of claim 3 wherein said method further includes the step of:

clearing the assignment of a transcriber terminal to a dictation terminal in said assignment table when said assigned transcriber terminal has completed the transcribing of an assigned voice dictation segment and no additional voice dictation segments exist from the assigned dictation terminal.

10. The method of claim 3 wherein said segmenting step (b) includes the step of:

generating from the characteristics of the voice dictation signal a signal for segmenting the received voice dictation signals.

11. A dictation transcribing system comprising a plurality of dictation terminals each operable by a user for transmitting voice dictation signals to one or more remote locations, a plurality of transcriber terminals at remote locations each operable by a user for transcribing voice dictation signals received from the dictation terminal, means for switching voice dictation signals from said dictation terminal to said first or second transcriber terminals, and means for controlling said switching means characterized in that said system further comprises means connected to each dictation terminal for partitioning said voice dictation signals into time sequential voice dictation segments and said controlling means includes storing means responsive to a signal from each transcriber terminal for storing an entry identifying the time when each assigned transcriber terminal is no longer busy transcribing and means responsive to said partitioning means for assigning and transmitting each of said voice dictation segments to one of said transcriber terminals by selecting the transcriber terminal having the earliest time entry in said storing means.

12. The invention of claim 11 wherein said controlling means further includes an assignment table means for storing which transcriber terminals are assigned a voice dictation segment from which dictation terminals, means for determining the busy status of each transcriber terminal and means for assigning and transmitting a voice dictation segment from a dictation terminal to a non-busy transcriber terminal assigned to said dictation terminal.

13. The invention of claim 12 wherein said controlling means further includes means for assigning a non-busy transcriber terminal presently unassigned or assigned to a second dictation terminal to receive a voice dictation segment from said dictation terminal when each transcriber terminal assigned to said dictation terminal is busy.

14. The invention of claim 13 wherein said controlling means further includes means for assigning and transmitting to a non-busy transcriber terminal a voice dictation segment from a dictation terminal by selecting said non-busy transcriber terminal having the earliest time entry in said storing means.

15. A dictation transcribing system comprising a plurality of dictation terminals each operable by a user for transmitting voice dictation signals to one or more remote locations, a plurality of transcriber terminals at remote locations each operable by a user for transcribing into transcription signals the voice dictation signals received from the dictation terminal, a plurality of display means remote from said transcriber terminals for displaying said transcription signals transmitted from said transcriber terminals, means for switching voice dictation signals and transcription signals among said dictation terminals, said transcriber terminals, and said display means and means for controlling said switching means characterized in that said dictation terminal includes means for generating an address signal specifying the display means of said system to display said transcription signals and said controlling means includes means responsive to said address signal for selecting a display means for receiving said transcription signals.

* * * * *